United States Patent [19]

Thorax et al.

[11] Patent Number: 4,888,471
[45] Date of Patent: Dec. 19, 1989

[54] AN IMPROVEMENT IN A DEVICE FOR HIGH ACCURACY THERMAL REGULATIONS OF AN ENCLOSURE

[75] Inventors: Didier Thorax, Argenteuil; Marotel Gerard, Sartrouville, both of France

[73] Assignee: Compagnie D'Electronique et de Piezo-Electricite C.E.P.E., Argenteuil, France

[21] Appl. No.: 112,717
[22] PCT Filed: Feb. 3, 1987
[86] PCT No.: PCT/FR87/00031
§ 371 Date: Sep. 29, 1987
§ 102(e) Date: Sep. 29, 1987
[87] PCT Pub. No.: WO87/04816
PCT Pub. Date: Aug. 13, 1987

[30] Foreign Application Priority Data

Feb. 4, 1986 [FR] France ................ 8601524
Dec. 12, 1986 [FR] France ................ 8617405

[51] Int. Cl.[4] .............................. H05B 1/02
[52] U.S. Cl. .................... 219/501; 219/497; 219/499; 219/505; 219/210; 323/366
[58] Field of Search ............... 219/501, 494, 497, 499, 219/507, 505, 504, 490, 491, 209, 210; 307/252 VA, 252 B, 117; 323/365, 366

[56] References Cited

U.S. PATENT DOCUMENTS

| 3,942,075 | 3/1976 | Maran et al. | 219/501 |
| 4,216,371 | 8/1980 | Marotel | 219/501 |
| 4,236,064 | 11/1980 | Aiba | 219/497 |
| 4,362,924 | 12/1982 | Story et al. | 219/497 |
| 4,404,462 | 9/1983 | Murray | 219/497 |
| 4,567,353 | 1/1986 | Aiba | 219/497 |
| 4,629,852 | 12/1986 | Andre | 219/497 |

FOREIGN PATENT DOCUMENTS

| 0004233 | 9/1979 | European Pat. Off. . |
| 0142410 | 5/1985 | European Pat. Off. . |
| 2557164 | 6/1977 | Fed. Rep. of Germany . |
| 2536553 | 5/1984 | France . |
| 2050648 | 1/1981 | United Kingdom . |

Primary Examiner—M. H. Paschall
Attorney, Agent, or Firm—Oblon, Spivak, McClelland, Maier & Neustadt

[57] ABSTRACT

In a device for thermal regulation of an enclosure comprising a temperature-measuring circuit which consists of a resistor bridge, of at least one heat-sensitive element on one bridge arm and of an amplifier, a control signal which is representative of the difference between the measured temperature of the enclosure and a reference temperature is delivered at the output of the amplifier. The absolute value of the control signal is adjusted by a negative feedback loop. A circuit for heating the enclosure is regulated by the temperature-measuring circuit and is constituted by at least one control transistor which delivers an adjustable heating current. The feedback loop of the output amplifier is mounted between the emitter resistor of the control transistor and the inverting input of the amplifier.

20 Claims, 4 Drawing Sheets

FIG_3

FIG_4

FIG_5

AN IMPROVEMENT IN A DEVICE FOR HIGH ACCURACY THERMAL REGULATIONS OF AN ENCLOSURE

BACKGROUND OF THE INVENTION

1. Field of the Invention

The present invention relates to devices for heating and thermal regulation of any body but more particularly of enclosures containing devices having operating characteristics which are very sensitive to temperature variations such as piezoelectric crystal oscillators.

2. Description of the Prior Art

A device for thermal regulation of an enclosure has already been disclosed in European patent No. 4,233 granted to the present Applicant. This device comprises a circuit for measuring the temperature of the enclosure and a circuit for heating said enclosure. The measuring circuit consists of a resistor bridge, one arm of which is provided with at least one heat-sensitive element, as well as an amplifier for delivering at its output a control signal which is representative of the difference between the measured temperature of the enclosure and a reference temperature, the absolute value of said control signal being adjusted by means of a negative feedback loop. The heating circuit is supplied from a voltage source and regulated by the temperature-measuring circuit. Said heating circuit is usually constituted by at least one voltage-stabilizing semiconductor circuit, a heating current being passed through said circuit and adjustable by means of a control transistor which is subjected to said control signal. In certain instances, the heating circuit can be constituted solely by the control transistor. In these two instances, the negative feedback loop of the output amplifier of the temperature-measuring circuit is taken directly from the output of said amplifier. The result thereby achieved is that the gain of the thermal regulation device must be adjusted for each product by reason of the dispersion of characteristics of the control transistor which is subjected to the control signal delivered by the output amplifier. A non-linear heating current which is a function of the control voltage is also observed.

SUMMARY OF THE INVENTION

The object of the present invention is to provide a remedy for the deficiencies observed in the regulating device considered in the foregoing.

The invention is accordingly directed to an improvement in the device for thermal regulation of an enclosure as described in European patent No. 4,233, which consists in connecting the negative feedback loop of the output amplifier of the temperature-measuring circuit between the emitter resistor of the control transistor and the input of said amplifier.

By means of this arrangement, the voltage at the terminals of the emitter resistor is proportional to the signal applied to the noninverting input of the output amplifier of the temperature-measuring circuit.

In this case, the regulating system is no longer dependent on the electrical parameters of the control transistor and the current gain is related solely to the values of the emitter resistor, of the negative feedback resistor and of the measuring bridge resistors. This results in good reproducibility of the system.

The circuit assembly in accordance with the present invention can be employed in the thermal regulation device described in European patent No. 4,233. However, this assembly can also be employed in thermal regulation devices providing proportional-plus-integral-plus-derivative control action as described in French patent application No. 82.19584 filed in the name of the present Applicant. In the case of these regulating devices, when the feedback loop of the output amplifier consists of a resistor, it is necessary to compensate for the voltage drop at the terminals of this resistor. To this end, the inverting input of the amplifier is connected through a resistor to the output of the stabilized-voltage generator. However, in order to prevent saturation of the integral-action operational amplifier when the thermostat is regulating, it is necessary to adjust the value of the resistor provided on the inverting input of the output amplifier and the stabilized-voltage generator as a function of the reference temperature.

In accordance with a distinctive feature of the present invention, this adjustment operation is eliminated by providing means for automatically fixing the operating point of the temperature-measuring circuit irrespective of the reference voltage.

In a preferential embodiment, the means for automatically fixing the operating point of the temperature-measuring circuit irrespective of the reference voltage consist of a fixed resistor connected to the inverting input of the output amplifier and biased by a voltage source which is directly a function of the reference voltage. Thus the fixed resistor is connected to the output of a differential amplifier for receiving the reference voltage on its noninverting input and a bias voltage on its inverting input. In accordance with a further possibility, the fixed resistor is connected to the output of a proportional-action operational amplifier which receives the reference voltage on its noninverting input and a bias voltage on its inverting input.

The present invention can also be employed with heating circuits such as those described in French patent application No. 83 16549 filed in the name of the present Applicant.

Different types of voltage-stabilizing semiconductor circuits can be contemplated for the heating circuit. In all cases, however, the voltage-stabilizing circuit includes at least one element selected from a diode, a Zener diode, a field-effect transistor (FET) and in particular a MOSFET, a bipolar transistor, a series and/or parallel voltage-regulating circuit in the form of discrete components or in integrated form.

In a preferential embodiment, each semiconductor circuit is constituted by a transistor, the base potential of which is fixed by a voltage-dividing bridge formed by a resistor and a Zener diode and the emitter of which is connected to the collector of the transistor of the following semiconductor circuit as described in European patent No. 4,233. However, with this arrangement, each heating transistor has its own biasing bridge, thus resulting in a large number of resistors and Zener diodes as well as high power consumption.

As a consequence, the present invention offers an additional feature in that the series-connected voltage-stabilizing semiconductor circuits are subjected to a fraction of the supply voltage as obtained by means of a resistor bridge which is common to all the semiconductor circuits, said bridge being mounted between the supply voltage and the emitter resistor of the control transistor.

Biasing of the semiconductor circuits and more particularly of the heating transistors is carried out in this case by means of a single biasing bridge. In addition, this bias is referenced with respect to the terminal voltage of the emitter resistor of the heating transistor, thus permitting compensation of the collector-emitter voltage of each transistor as a function of the heating current. This results in more uniform power distribution as a function of the heating current.

Furthermore, in order to reduce the current within the resistor bridge, the heating transistors are preferably of the Darlington type.

BRIEF DESCRIPTION OF THE DRAWINGS

In order to simplify the description, the same elements are designated in the figures by the same references.

DESCRIPTION OF THE PREFERRED EMBODIMENTS

The improvement in accordance with the present invention will first be described with reference to FIG. 1 in the case of a device for thermal regulation of an enclosure of the type described in European patent No. 4,233 granted to the present Applicant.

Figure 1:
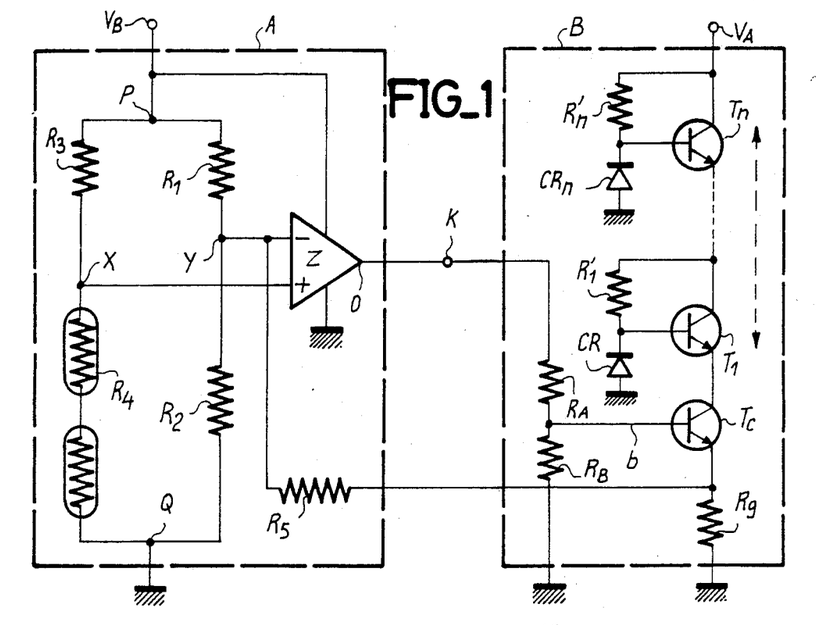
FIG. 1 is an electrical diagram of a device for thermal regulation of an enclosure in a first embodiment of the present invention.

As illustrated in FIG. 1, this device essentially includes a temperature-measuring circuit designated by the reference A and a heating circuit designated by the reference B.

The measuring circuit A is made up of one or a number of heat-sensitive elements or temperature sensors $R_4$ connected in series. These sensors are included in one arm of a resistor bridge, the three other arms of which carry resistors $R_1$, $R_2$, $R_3$. One of the diagonals of the bridge is supplied with direct-current voltage and accordingly receives a voltage VB at the bridge point P while the opposite point Q of the diagonal is grounded. The ends XY of the other bridge diagonal are connected to the two inputs of an operational amplifier Z having a negative feedback loop which is provided with a resistor $R_5$ and the arrangement of which will be explained in detail hereinafter.

The heating circuit B includes a chain of transistors which are connected in series through their emitters and collectors and are designated by the references $T_1$ to $T_n$. These transistors are mounted as voltage regulators. The base of the transistors $T_1$ to $T_n$ are maintained at a constant potential by a bridge formed by a resistor and Zener diode such as the bridge $R'_n$ and $CR_n$ in the case of the transistor $T_n$.

The transistor $T_C$ which is mounted in series with the transistor $T_1$ performs the function of control transistor. The base of the transistor $T_C$ is connected to the output of the operational amplifier Z through a voltage-dividing bridge RA-RB having the intended function of providing a coupling link, taking into account the particular conditions of biasing of the amplifier Z. This voltage-dividing bridge has a suitable ratio and serves to reduce the residual output voltage of the amplifier to its low level in order to attain a value below the base cutoff voltage of the transistor $T_C$. By connecting the transistor $T_C$ as an emitter-follower, its base voltage is restored to the level of its emitter and, since this latter is connected to ground through an emitter resistor $R_9$, the current I of the chain of transistors $T_C$, $T_1$ to $T_n$ is determined by the variations in base voltage of the transistor $T_C$ which can contribute to heating of the enclosure in the same manner as the other transistors.

In accordance with the present invention, the resistor $R_5$ of the negative feedback loop of the output amplifier Z is connected between the emitter resistor $R_9$ and the inverting input of the operational amplifier Z. By means of this arrangement, the voltage at the terminals of the emitter resistor $R_9$ is proportional to the voltage on the inverting input of the amplifier Z. Furthermore, the regulating system is no longer dependent to any extent on the electrical parameters of the transistor $T_C$ and the current gain is related to the values of the resistors $R_1$, $R_2$, $R_5$ and $R_9$, thus permitting good reproducibility of the system.

Moreover, the operation of the circuit described in the foregoing is identical with the operation described in European patent No. 4,233 which has been cited earlier and to which reference may usefully be made. It is further apparent to those versed in the art that all the modifications made in the heating circuit as described in European patent No. 4,233 can be incorporated in the present invention, particularly in regard to the current-limiting circuit consisting of a transistor amplifier which is driven by a signal applied to its base and related to the current to be limited and which in turn produces action by means of its collector on the base of the control transistor $T_C$.

Two other embodiments of the present invention will now be described with reference to FIGS. 2 and 3. In these two embodiments, the temperature-measuring circuit has been modified with a view to incorporating a regulating device having proportional-plus-integral-plus-derivative action as described in French patent application No. 82 19584 granted to the present Applicant.

Figure 2:
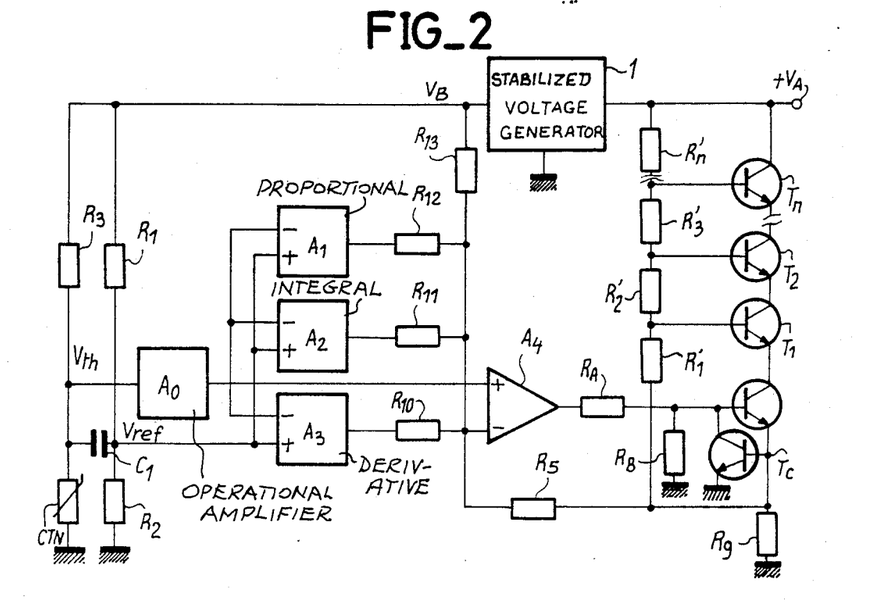
FIG. 2 is a diagram of another embodiment of the invention.

As illustrated in FIG. 2, a positive voltage VA is supplied to a stabilized-voltage generator 1, the output voltage VB of which is intended to supply a resistor bridge and five operational amplifiers $A_0$ to $A_4$. The resistor bridge has a resistor $R_3$, the voltage VB being applied to a first end of this resistor and a measuring voltage VTH being applied to the second end which is connected to one end of at least one thermistor CTN having a negative temperature coefficient, the opposite end of which is grounded. The measuring voltage VTH is thus a decreasing function of temperature. In addition, the voltage VB is also supplied to a second arm of the bridge formed by the resistor $R_1$ which is mounted between the voltage VB and a midpoint or node having a reference voltage Vref. This node is connected to a resistor $R_2$, the opposite terminal of which is connected to ground. A decoupling capacitor $C_1$ is provided between the nodes X and Y of the two arms of the resistor bridge. Furthermore, the voltage VTH is sent to an operational amplifier $A_0$ mounted as a voltage follower. The output of the amplifier $A_0$ is sent to the inverting inputs of three parallel-connected operational amplifiers $A_1$, $A_2$, $A_3$, the forward-bias noninverting inputs of which receive the reference voltage Vref. The three operational amplifiers $A_1$, $A_2$, $A_3$ are intended to be employed respectively for the proportional, integral and derivative corrections and are constructed in the manner described in French patent application No. 82 19584. In consequence, the amplifier $A_1$ has proportional action, the amplifier $A_2$ has integral action and the amplifier $A_3$ has derivative action. The outputs of the amplifiers $A_1$, $A_2$, $A_3$ are connected respectively through three resistors $R_{10}$, $R_{11}$, $R_{12}$ to the inverting terminal of an output operational amplifier $A_4$, the forward-bias noninverting input of which receives the output of the amplifier $A_0$. In accordance with the present invention, the amplifier $A_4$ is provided with a negative feedback loop consisting of a resistor $R_5$ which is mounted between the emitter resistor $R_9$ of the control transistor $T_C$ and the inverting input of the amplifier $A_4$.

In order to compensate for the voltage drop at the terminals of the resistor $R_5$, the output of the generator 1 is connected through the resistor $R_{13}$ to the inverting input of the amplifier $A_4$.

The operation of this circuit is identical with the operation of the regulating device described in French patent application No. 82 19584. However, as a result of the negative-feedback loop circuit arrangement, the voltage at the terminals of the resistor $R_9$ is proportional to the sum of the signals delivered by the amplifiers $A_1$, $A_2$, $A_3$ and of the voltage VB and the current gain is solely related to the values of the resistors $R_{10}$, $R_{11}$, $R_{12}$, $R_{13}$, $R_5$ and $R_9$, thus making it possible to obtain good reproducibility of the circuit since it is no longer dependent on the electrical parameters of the control transistor $T_C$.

Figure 3:
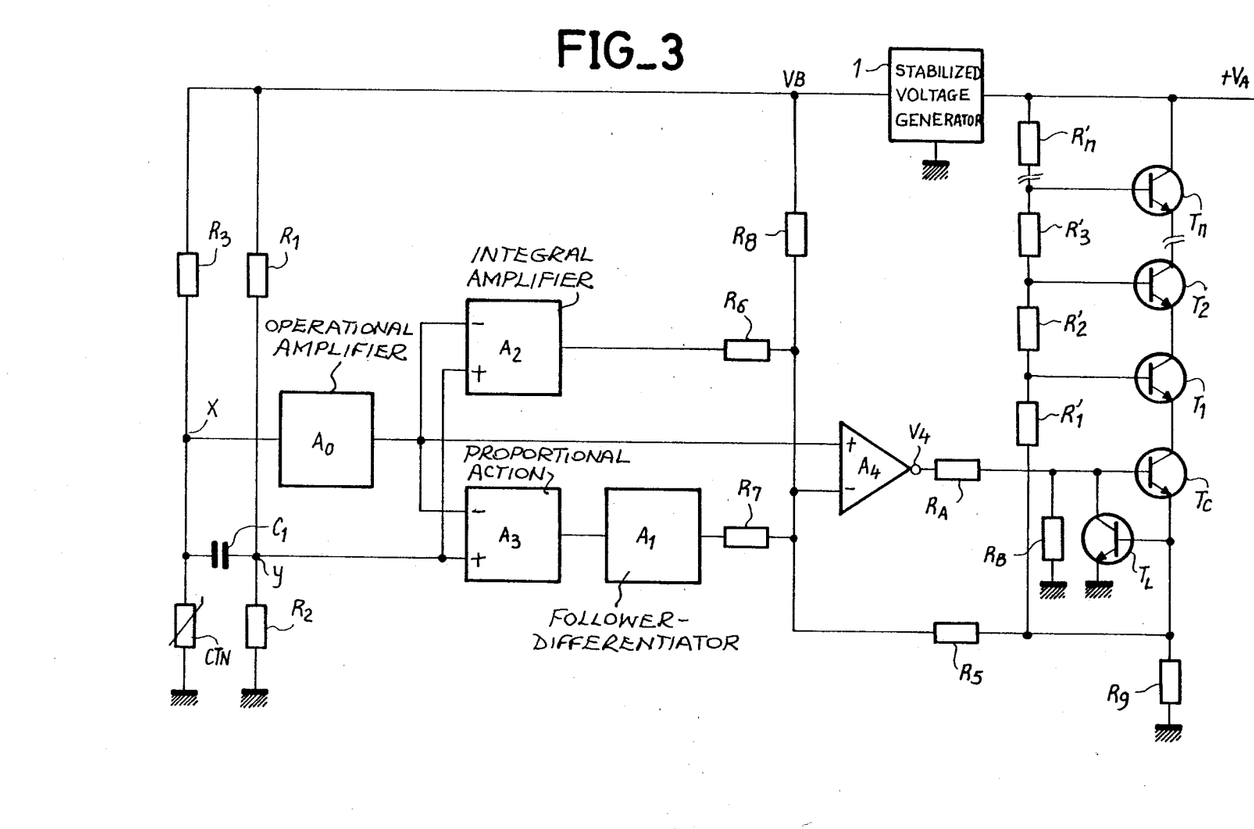
FIG. 3 is an electrical diagram of a third embodiment of the invention.

As shown in FIGS. 2 and 3, the heating circuit has also been modified with respect to the heating circuit described in European patent No. 4,233 or in French patent application No. 82 19584. In fact, the bases of the heating transistors $T_1$, $T_2$, $T_n$ are connected in this case to a common voltage-dividing bridge made up of resistors $R'_1$, $R'_2$, $R'_3$, $R'_n$ which are mounted between the common node of resistors $R_5$ and $R_9$ and the supply voltage $V_4$.

The advantage of this arrangement lies in the achievement of a reduction both in the number of components to be wired and in power consumption since the bridge is made up only of resistors in series. Furthermore, biasing of the different transistors is referenced with respect to the voltage at the terminals of the emitter resistor $R_9$, the object thus contemplated being to compensate the collector-emitter voltage of each transistor as a function of the heating current.

It should further be noted that the control transistor $T_C$ is mounted in series with the transistor $T_1$. The base of the transistor $T_C$ is connected to the output of the output amplifier $A_4$ through a voltage-dividing bridge $R_A$-$R_B$, the intended function of which is to provide a connection which takes into account the particular conditions of biasing of the amplifier $A_4$. In addition, a transistor $T_L$ is mounted between the base and the emitter of the control transistor $T_C$, with the result that the base of the transistor $T_L$ is connected to the emitter of the transistor $T_C$, the emitter of the transistor $T_L$ is connected to ground and the collector of the transistor $T_L$ is connected to the base of the transistor $T_C$.

Moreover, as mentioned in French patent application No. 83 16549 in the name of the present Applicant, the transistors $T_C$, $T_1$, $T_2$, $T_n$ will preferably be transistors of the Darlington type in order to reduce the current in the resistor bridge $R'_1$ to $R'_n$.

In FIG. 3, there is shown an alternative embodiment of the regulating device of FIG. 2. In this case, the derivative-action operational amplifier $A_1$ has been replaced by a "follower-differentiator" amplifier $A'_1$, the output voltage of which is equal to the sum of its input voltage and of its derivative. The amplifier $A'_1$ is positioned at the output of the proportional-action amplifier $A_3$. This makes it possible to employ a biased chemical capacitor for the "follower-differentiator" amplifier, thus permitting an appreciable reduction in overall size and cost of the circuit. The other parts of the circuit shown in FIG. 3 are identical with the circuit of FIG. 2, particularly in regard to the improvements achieved by the present invention.

Figure 4:
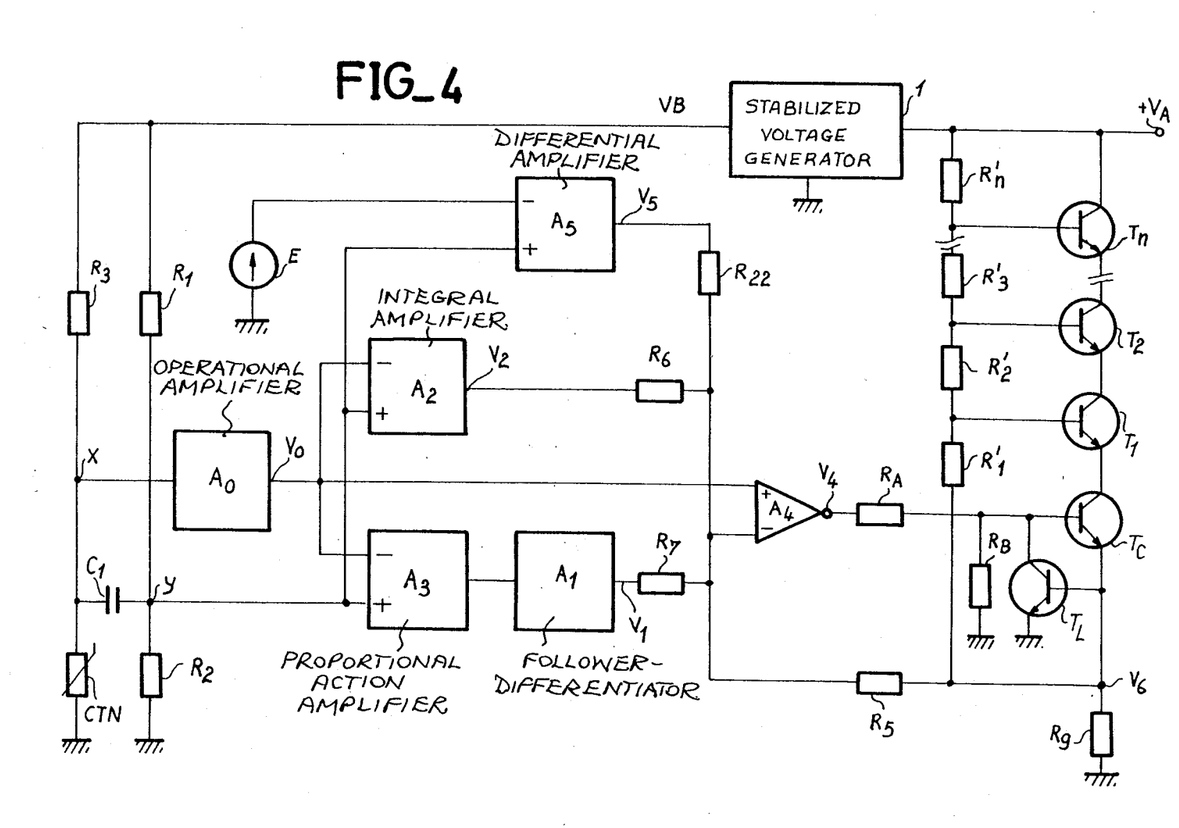
FIG. 4 is a diagram of an improvement made in the device of FIG. 3.

In accordance with another distinctive feature of the present invention as shown in FIG. 4, the inverting input of the output operational amplifier $A_4$ is connected through a fixed resistor $R_{22}$ to the output of a differential amplifier $A_5$, the forward-bias noninverting input of which receives the reference voltage Vref and the inverting input of which receives a bias voltage E.

This characteristic feature is applicable both to the embodiment of FIG. 2 and to the embodiment of FIG. 3.

The operation of the regulating device has been described in the foregoing except for this improvemnt, the operation of which will now be explained. It has thus become apparent that, under conditions of regulation, the differential voltage of the measuring bridge composed of the resistors $R_1$, $R_2$, $R_3$ and of the thermistor CTN is zero. In consequence, the voltage $V_0$ at the output of the operational follower amplifier $A_0$ is equal to the voltage at the node Y, namely the reference voltage Vref. The result thereby achieved is that the voltage $V_1$ at the output of the operational amplifier $A_1$ is equal to the voltage $V_0$ since the differential voltage at the input of the amplifier $A_3$ is zero. Since the output amplifier $A_4$ operates in the linear mode, the voltage on its noninverting input is equal to the voltage on its inverting input.

Furthermore, the transfer function of the differential amplifier $A_5$ is given by the following equation:

$$V_5 = G \cdot V_0 - J \cdot E$$

where G and J are constants.

With all the parameters given above, it is possible to compute the voltage $V_2$ at the output of the operational amplifier $A_2$ as a function of the voltages $V_0$, $V_1$, $V_6$ and E by applying the Milmann theorem to the inverting input of the output operational amplifier $A_4$. The following equation is accordingly obtained:

$$V_2 = V_0 \left( 1 + \frac{R_6}{R_5} + \frac{R_6}{R_{22}}(1 - G) \right) + JE \frac{R_6}{R_{22}} - \frac{V_6 R_6}{R_5}$$

In accordance with the present invention, saturation of the integral-action amplifier $A_2$ is prevented by choosing the value of the constant G with a view to ensuring that the voltage $V_2$ at the output of the amplifier $A_2$ is not dependent on the voltage $V_0$. To this end, the term between brackets must accordingly be zero and we obtain:

$$G = 1 + \frac{R_{22}}{R_6} + \frac{R_{22}}{R_5}$$

In this case:

$$V_2 = JE\frac{R_6}{R_{22}} - \frac{V_6 R_6}{R_5}$$

Thus the output voltage of the integral-action amplifier $A_2$ is now dependent on only two terms:

$V_6$ which is a function of the heating current,

E which is a voltage to be chosen as a function of J in order to set the operating point of the integral-action amplifier $A_2$.

Figure 5:
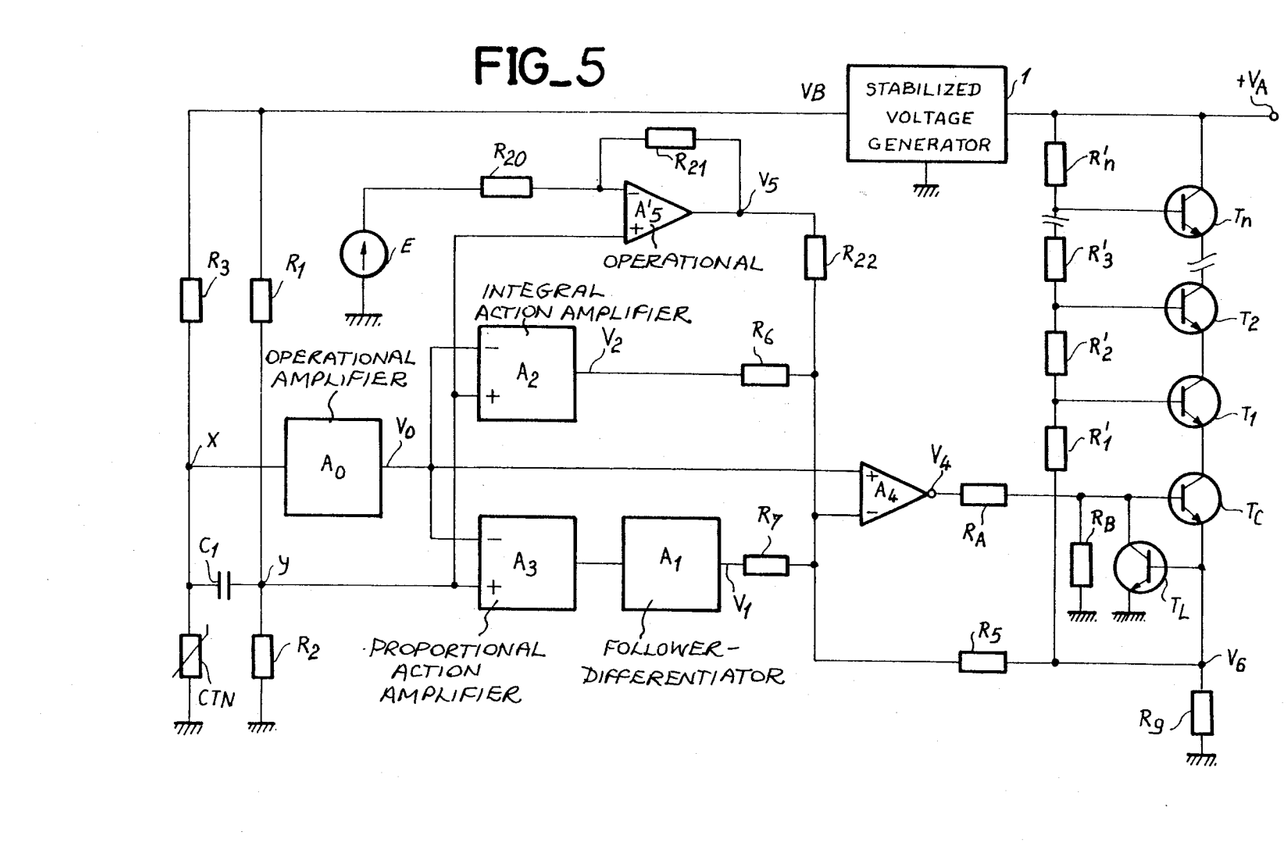
FIG. 5 is a diagram of another embodiment of the improvement of FIG. 4.

In another embodiment which is illustrated in FIG. 5, the differential amplifier $A_5$ is replaced by an operational amplifier $A'_5$ associated with two resistors $R_{21}$ and $R_{20}$. More specifically, the resistor $R_{20}$ is connected between the bias voltage E and the inverting input of the amplifier $A'_5$ while the resistor $R_{21}$ is connected between the output and the inverting input of the amplifier $A'_5$.

In this case, the transfer function of the amplifier $A'_5$ is given by the following equation:

$$V_5 = V_0\left(1 + \frac{R_{21}}{R_{20}}\right) - E\frac{R_{21}}{R_{20}}$$

By comparing this equation with equation $V_5$: $G \cdot V_0 - J \cdot E$, we obtain:

$$G = 1 + \frac{R_{21}}{R_{20}} \text{ and } J = \frac{R_{21}}{R_{20}}$$

hence the relation which gives the voltage $V_2$ at the output of the amplifier $A_2$ as a function of $V_0$, $V_6$ and E.

$$V_2 = V_0\left(1 + \frac{R_6}{R_5} - \frac{R_6 R_{21}}{R_{22} R_{20}}\right) - V_6\frac{R_6}{R_5} + E\frac{R_6 R_{21}}{R_{22} R_{20}}$$

Should it be found desirable to ensure that the voltage $V_2$ is not dependent on the voltage $V_0$, we accordingly obtain:

$$1 + \frac{R_6}{R_5} = \frac{R_6 R_{21}}{R_{22} R_{20}}$$

Thus the voltage $V_2$ is now dependent only on $V_6$ and on E. In this case, it is the voltage source E which will establish the operating point of the integral-action amplifier $A_2$.

It will be readily apparent to those versed in the art that all alternative forms of construction described in European patent No. 4,233 and in French patent applications No. 82 19584 and No. 83 16549 are equally applicable to the present Application.

What is claimed is:

1. An improvement in a device for thermal regulation of an enclosure comprising:
   a temperature measuring circuit which comprises a resistor bridge with four arms, at least one heat-sensitive element on one arm;
   an output amplifier having an inverting input directly connected to a common point between two of said bridge arms which is defined as a first output of said resistor bridge, and a non-inverting input connected to a second output of the resistor bridge, said second output being located at the common point between two other arms, said output amplifier delivering an output control signal which is representative of the difference between the measured temperature of the enclosure and a reference temperature;
   a circuit for heating the enclosure which is supplied from a voltage source and regulated by the temperature measuring circuit, said heating circuit comprising at least one control transistor having an emitter resistor for delivering a heating current which is adjustable based upon the output of said control transistor wherein the device further comprises a negative DC current feedback loop directly connected between the emitter resistor and the inverting input of said output amplifier.

2. An improvement according to claim 1, wherein the heating circuit further comprises at least one voltage-stabilizing semiconductor circuit through which a heating current flows, said heating current being adjustable by means of the control transistor.

3. An improvement according to claim 1, wherein the temperature-measuring circuit further comprises:
   a regulation circuit which has proportional-plus-integral-plus-derivative action mounted between the first and second outputs of the resistor bridge and at least the inverting input of said output amplifier.

4. An improvement according to claim 1, wherein the series-connected voltage-stabilizing semiconductor circuits are subjected to a fraction of the supply voltage obtained through a bridge of resistors which are common to all the semiconductor circuits, said resistor bridge being mounted between the supply voltage and the emitter of the control transistor.

5. An improvement according to claim 3 wherein the regulation circuit comprises three operational amplifiers mounted in parallel;
   the inverting input of each operational amplifier being connected to the first output of the resistor bridge, said first output being adapted to deliver a measuring voltage as a decreasing function of the enclosure temperature;
   the forward bias non-inverting input of each operational amplifier being connected to the second output of the resistor bridge, said second output being adapted to deliver a reference voltage given by a generator;
   the output of each operational amplifier and the output of the generator being applied to the inverting input of said output amplifier;
   the first amplifier being designated for proportional action;
   the second amplifier being designated for integral action;
   the third amplifier being designated for derivative action.

6. An improvement according to claim 3, wherein the regulation circuit having proportional plus integral plus derivative action comprises:
   three operational amplifiers consisting of an integral action amplifier, an amplifier mounted as a follower-differentiator, a proportional action amplifier;

the non-inverting forward bias input of the integral action amplifier and of the proportional action amplifier being each connected to the second output of the resistor bridge, said second output being adapted to deliver a reference voltage given by a generator;

the inverting input of the integral action amplifier and of the proportional-action amplifier being each connected to the first output of the resistor bridge, said first output being adapted to deliver a measuring voltage as a decreasing function of the enclosure temperature;

the amplifier mounted as a follower-differentiator being connected to the output of the proportional-action amplifier;

the output of the integral action amplifier, the output of the amplifier mounted as a follower differentiator and the output of the generator being applied to the inverting input of said output amplifier.

7. An improvement according to claim 5, wherein provision is made for a fourth operational amplifier which is mounted as a follower and receives the measuring voltage on its forward-bias non-inverting input and the output of which is connected so as to supply at least one of the three operational amplifiers or the output amplifier with the measuring voltage.

8. An improvement according to claim 5, wherein means are provided for automatically establishing the operating point of the temperature-measuring circuit irrespective of the reference voltage.

9. An improvement according to claim 8, wherein the means for automatically establishing the operating point of the temperature-measuring circuit irrespective of the reference voltage are constituted by a fixed resistor connected to the inverting input of the output amplifier and biased by a voltage source which is directly a function of the reference voltage.

10. An improvement according to claim 9, wherein the fixed resistor is connected to the output of a differential amplifier which receives the reference voltage on its noninverting input and a bias voltage on its inverting input.

11. An improvement according to claim 10, wherein the constant G of the transfer function of the differential amplifier is chosen so that:

$$G = 1 + \frac{R_{22}}{R_5} + \frac{R_{22}}{R_6}$$

where; $R_5$ is the resistance of the feedback loop of the output amplifier;

$R_{22}$ is the resistance connected to the output of the differential action amplifier; and $R_6$ is the resistance connected to the output of the integral-action amplifier.

12. An improvement according to claim 5, wherein the fixed resistor is connected to the output of a proportional-action operational amplifier, the reference voltage being applied to the noninverting input of said amplifier and a bias voltage being applied through a resistor to the inverting input of said amplifier, a resistor being mounted between the output and the inverting input of said amplifier.

13. An improvement according to claim 12, wherein the resistors are chosen so that:

$$1 + \frac{R_6}{R_5} = \frac{R_6 R_{21}}{R_{22} R_{20}}$$

where $R_5$ is the resistance of the feedback curve of the output amplifier $R_{20}$ is the resistance connected between a means for supplying the bias voltage to said proportional action operational amplifier; the feedback curve of the output amplifier;

$R_{21}$ is the resistance connecting the output of said proportional action operational amplifier and the inverting input thereof;

$R_{22}$ is the resistance of said connected the output of said proportional action amplifier; and $R_6$ is the resistance connected to the output of the integral-action amplifier.

14. An improvement according to claim 6, wherein provision is made for a fourth operational amplifier mounted as a follower is adapted to receive the measuring voltage on its forward-bias noninverting input, the output of said amplifier being connected so as to supply at least one of the three operational amplifiers or the output amplifier with the measuring voltage.

15. An improvement according to claim 6, wherein means are provided for automatically establishing the operating point of the temperature-measuring circuit irrespective of the reference voltage.

16. An improvement according to claim 15, wherein the means for automatically establishing the operating point of the temperature-measuring circuit irrespective of the reference voltage are constituted by a fixed resistor connected to an inverting input of the output amplifier and biased by a voltage source which is directly a function of the reference voltage.

17. An improvement according to claim 16, wherein the fixed resistor is connected to the output of a differential amplifier adapted to receive the reference voltage on its noninverting input and a bias voltage on its inverting input.

18. An improvement according to claim 17, wherein the constant G of the transfer function of the differential amplifier is chosen so that:

$$G = 1 + \frac{R_{22}}{R_5} + \frac{R_{22}}{R_6}$$

where $R_5$ is the resistance of the feedback loop of the output amplifier $R_{22}$ is the resistance connected to the output of the differential amplifier and $R_6$ is the resistance connected to the output of the integral-action amplifier.

19. An improvement according to claim 6, wherein the fixed resistor is connected to the output of a proportional-action operational amplifier, the reference voltage being applied to a noninverting input of said amplifier and a bias voltage being applied through a resistor to the inverting input of said amplifier, a resistor being mounted between the output and the inverting input of said amplifier.

20. An improvement according to claim 19, wherein the resistors are chosen so that:

$$1 + \frac{R_6}{R_5} = \frac{R_6 R_{21}}{R_{22} R_{20}}$$

where $R_5$ is the resistance of the feedback curve of the output amplifier $R_{20}$ is the resistance connected between a means for supplying the bias voltage to said proportional action operational amplifier;

$R_{21}$ is the resistance connecting the output of said proportional action operational amplifier and the inverting input thereof;

$R_{22}$ is the resistance of said connected the output of said proportional action amplifier; and $R_6$ is the resistance connected to the output of the integral-action amplifier.

* * * * *